United States Patent
Wu et al.

(10) Patent No.: US 10,719,370 B2
(45) Date of Patent: Jul. 21, 2020

(54) DISTRIBUTED DYNAMIC PROCESSING METHOD FOR STREAM DATA WITHIN A COMPUTER SYSTEM

(71) Applicant: Huazhong University of Science and Technology, Wuhan, Hubei (CN)

(72) Inventors: Song Wu, Hubei (CN); Zhiyi Liu, Hubei (CN); Hai Jin, Hubei (CN); Fei Chen, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 100 days.

(21) Appl. No.: 16/180,460

(22) Filed: Nov. 5, 2018

(65) Prior Publication Data
US 2019/0205179 A1 Jul. 4, 2019

(30) Foreign Application Priority Data
Dec. 29, 2017 (CN) .......................... 2017 1 1497574

(51) Int. Cl.
*G06F 9/46* (2006.01)
*G06F 9/50* (2006.01)
(Continued)

(52) U.S. Cl.
CPC .......... *G06F 9/5083* (2013.01); *G06F 9/4881* (2013.01); *G06F 11/1469* (2013.01);
(Continued)

(58) Field of Classification Search
CPC ............. H04L 5/0001; G06F 16/90335; G06F 3/0659; G06F 9/4881; G06F 9/5083; G06F 16/27; G06F 16/24568; G06F 11/1469
See application file for complete search history.

(56) References Cited

U.S. PATENT DOCUMENTS

2005/0259544 A1* 11/2005 Park ..................... G11B 7/0956
  369/53.19
2014/0086256 A1*  3/2014 Raniere ................ H04L 5/0001
  370/401
(Continued)

OTHER PUBLICATIONS

Kostas Tzoumas, "High-throughput, low-latency, and exactly-once stream processing with Apache Flinktm", Flink Features, Aug. 2015, p. 1-18, Ververica < https://www.ververica.com/blog/high-throughput-low-latency-and-exactly-once-stream-processing-with-apache-flink > as <Ververica_Flink.pdf>.*

*Primary Examiner* — Tuan A Vu
(74) *Attorney, Agent, or Firm* — Michael X. Ye; Morris, Manning & Martin, LLP:

(57) ABSTRACT

The present invention involves with a dynamic distributed processing method for stream data, at least comprising: analyzing and predicting an execution mode of at least one data feature block of the data of a user stream data processing program; dynamically adjusting the execution mode based on an average magnitude of queue latency and a threshold of queue latency of the stream data; and processing corresponding said at least one data feature block based on the execution mode. By associating and combining the irrelevant data stream mode and micro-batch mode of stream data computing, the present invention successfully releases automatic shift and data process between the two modes, which advantageously has both the high throughput property and the low latency property.

5 Claims, 6 Drawing Sheets

(51) Int. Cl.
*G06F 9/48* (2006.01)
*G06F 11/14* (2006.01)
*G06F 16/27* (2019.01)
*G06F 16/2455* (2019.01)

(52) U.S. Cl.
CPC .. *G06F 16/24552* (2019.01); *G06F 16/24568* (2019.01); *G06F 16/27* (2019.01); *G06F 2201/84* (2013.01)

(56) References Cited

U.S. PATENT DOCUMENTS

2017/0242596 A1* 8/2017 Liu ................. G06F 3/0659
2018/0075100 A1* 3/2018 Park ............... G06F 16/90335

* cited by examiner

DISTRIBUTED DYNAMIC PROCESSING METHOD FOR STREAM DATA WITHIN A COMPUTER SYSTEM

FIELD

The present invention relates to stream data processing, and more particularly to a distributed dynamic processing method for stream data within a computer system.

DESCRIPTION

In a traditional data processing process in a computer system, data have to be collected and stored in a database so that people can search the data in the database for the information they need. Such a process is based on two prerequisites. First, the data are something previously existing. When people make an inquiry in the database, the data in the database are snapshots in some past moments and outdated or even obsolete. Second, such a process has to be initiated by people. In other words, not until an inquiry is made, can processing of data be realized. However, in some occasions, both of the prerequisites are not established. For example, in a stock market, there are always data being generated, and people need to make instant decisions based on these real-time data. In such a case, the data volume is extremely huge, and thus it is desired to have a system that can actively inform its user when data meet certain conditions and can automatically operate. In order to satisfy this desire, stream data processing as a technology has been developed to process real-time data stream as demanded by users and store the processed results or feed them back to the initiating end, so that the users can be aware of the dynamics of the latest data at any time. There are many examples where real-time stream data processing are required in production scenarios, such as real-time advertising, real-time analysis of social media data, web log processing, real-time processing of smart grid data and more. What all these scenarios have in common are high data volume and high immediacy.

There are two known approaches to stream data computing, namely the data stream mode and the micro-batch mode. The data stream mode provides a process where after data have passed through nodes successively, the processing is completed. Just like a production line in a factory, which operation is performed at which node is relatively fixed, and stream data flow among the nodes according to execution logic. The data stream mode is advantageous for its way of expression. Data are processed as soon as they arrive. This makes systems using this approach have much better latency as compared to micro-batch processing. The data stream mode has more of its resources invested to ensure low latency, and consequently its data throughput is relatively low. The micro-batch mode involves manually dividing continuous data stream by time into small batches of data, placing the batched data into corresponding nodes, and iterating topology of the nodes so as to complete computation. This approach provides relatively high throughput as it eliminates transmission of huge data among nodes yet it has relatively great latency of data processing due to data accumulation.

As described above, the two known approaches to stream data distributed processing in computer systems have their respective merits and demerits. The data stream mode has low processing latency at the expense of low throughput. On the other hand, the micro-batch mode has high throughput with the expense of high processing latency. Neither of the two opposite technical schemes can meet the need of high-throughput, low-latency processing of stream data. Besides, by analyzing the existing stream processing logic, it is found that different operations have different levels of data amplification. Some operations amplify data by, for example, dividing a sentence into words and thereby increasing the volume of data, and others reduce data by, for example, screening data. Thus, a complete stream processing logic involves both increase and decrease of data.

The inventor of the present invention has tried to find a distributed method for processing stream data using a computer system that provides both high throughput and low latency when processing stream data in a distributed manner. The method features an ability to, according to prediction made before execution of stream data processing logic and variations of the external data source and of cluster execution capacity during stream data processing, select the most appropriate execution mode to execute that part of the stream data processing logic, so as to effectively increase throughput and decrease latency of distributed stream data processing while maintaining mode change transparent to its user and preventing repeated stream data processing, thereby improving performance of distributed processing for stream data in computer systems.

SUMMARY OF THE INVENTION

To address the shortcomings of the prior art, the present invention provides a distributed dynamic processing method for stream data within a computer system, being characterized in at least comprising: analyzing and predicting an execution mode of at least one data feature block of the data of a user stream data processing program within a computer system; determining an average magnitude of queue latency of the stream data; determining a threshold queue latency of the stream data; dynamically adjusting the execution mode based on the average magnitude of queue latency and the threshold of queue latency of the stream data; and processing within the computer system the at least one data feature block based on the dynamically adjusted execution mode. The method combines the unallied data stream mode and micro-batch mode for dynamic shift to realize stream data processing advantageously having high throughput and low latency. This provides improved performance of the computer system when handling data streams.

According to one preferred embodiment, the step of dynamically adjusting the execution mode comprises: tallying current status data of at least one node in a distributed stream data cluster; and adjusting the execution mode based on the current status data to:

$$\text{Execution Mode} = \begin{cases} \text{micro-batch mode} & \text{when } t > T_{up} \text{ and } \prod_{x=r}^{q} g_x \leq 1 \\ \text{data stream mode} & \text{when } t < T_{down} \end{cases},$$

wherein, $T_{up}$ is an upper threshold of the queue latency, $T_{down}$ is a lower threshold of the queue latency, and $g_x$ is an amplification of the $x^{th}$ operation data, $$g_x = \frac{n}{m},$$

m is an average input data volume, and n is an average output data volume.

According to one preferred embodiment, the upper threshold $T_{up}$ and the lower threshold $T_{down}$ are determined using equations:

$$\begin{cases} T_{up} = T * \alpha \\ T_{down} = T / \alpha \end{cases},$$

wherein, T is a standard time set by a user service level agreement, and α is a maximum system tolerance set by the user. By determining whether to shift the execution mode in consideration of both the latency time and the queue latency threshold, the method provides high accuracy and substantively improves efficiency in determining and shifting the execution mode.

According to one preferred embodiment, the step of dynamically adjusting the execution mode further comprises: dynamically adjusting the execution mode in a "suspension-adjustment-operation" manner, wherein the "suspension-adjustment-operation" manner comprises: adjusting the execution mode while the stream data from a data source is cached in a data buffer within the computer system; and processing the stream data in the data buffer based on the adjusted execution mode. Since shift of the execution mode happens at the time of caching the stream data, neither the stream data processing speed nor the overall operation of the stream data is affected.

According to one preferred embodiment, the method further comprises: recovering data of a failed node by means of creating cached data, and dynamically adjusting the number of nodes based on a balloon model so as to achieve load balance. By recovering failed nodes and adjusting load balance, the method can effectively prevent data loss and ensure processing efficiency for the stream data. Particularly, the balloon model can dynamically increase and decrease data resources, thereby achieving load balance and allowing fast processing for node data within a computer system.

According to one preferred embodiment, the step of analyzing and predicting the execution mode of the at least one data feature block of the data of the user stream data processing program within a computer system comprises: integrating at least one operation of a user into a complete operative chain, so as to determine a topology of the user; dividing the complete operative chain into at least one data feature block according to the application program interface function used by the user and an initial structure of the operative chain; determining a logic feature of the data feature block and selecting the execution mode according to the logic feature so as to generate a "Feature Block ID-Execution Mode" list; and mapping the data feature block to the corresponding execution mode based on the "Feature Block ID-Execution Mode" list so as to execute the part of the program within a computer system that corresponds to the data feature block. Mapping the divided data feature blocks is a preferred way to select the execution mode accurately and fast within the computer system. This prevents disarray of the data stream mode and micro-batch mode, and eliminates erroneous relevance between data feature blocks and the execution modes during transmission, thereby reducing the probability of errors in stream data computing and processing. Thus, the performance and efficiency of the computer system is improved.

According to one preferred embodiment, the step of dynamically adjusting the execution mode further comprises: suspending data input of the data feature block based on an execution mode shifting instruction, and completing processing the data received in the data feature block within the computer system; directing the data to be sent to the data feature block to the data buffer within the computer system for caching and adjusting the execution mode of the data feature block; the data feature block in an adjustment resuming status acquiring data from the buffer for processing; and resuming data input of the data feature block after completing processing the data from the buffer within the computer system.

According to one preferred embodiment, the step of dynamically adjusting the number of nodes based on a balloon model so as to achieve load balance comprises: configuring the data feature blocks with a balloon model required for data demand adjustment, setting the balloon model to inflation status and/or deflation status based on the current status of the data feature block, wherein the balloon model in the inflation status increases assigned data volume of the data feature block; and/or the balloon model in the deflation status retrieves excessive data from the data feature block, and allocates the retrieved data of the data feature block to a resource pool for reallocation.

The present invention further provides a distributed dynamic processing system for stream data within a computer system, being characterized in at least comprising a dispatching unit, a data receiving unit, and an executing unit, the dispatching unit analyzing and predicting an execution mode of at least one data feature block of the data of a user stream data processing program received by the data receiving unit; and dynamically adjusting the execution mode based on an average magnitude of queue latency and a threshold of queue latency of the stream data; and the executing unit processing corresponding said at least one data feature block based on the execution mode.

According to one preferred embodiment, the dispatching unit comprises a central dispatcher, a data stream mode dispatcher, and a micro-batch mode dispatcher, the central dispatcher dynamically adjusting the execution mode by: tallying current status data of at least one node in a distributed stream data cluster, and adjusting the execution mode based on the current status data to:

$$\text{Execution Mode} = \begin{cases} \text{micro-batch mode} & \text{when } t > T_{up} \text{ and } \prod_{x=r}^{q} g_x \leq 1 \\ \text{data stream mode} & \text{when } t < T_{down} \end{cases},$$

wherein, $T_{up}$ is an upper threshold of the queue latency, $T_{down}$ is a lower threshold of the queue latency, and $g_x$ is an amplification of the $x^{th}$ operation data, $$g_x = \frac{n}{m},$$

m is an average input data volume, and n is an average output data volume; and the data stream mode dispatcher and the micro-batch mode dispatcher correspondingly processing the data assigned thereto, respectively. The disclosed distributed dynamic processing system for stream data is capable of amplifying and compressing data in a complete stream processing logic. In particular, it uses the high-throughput property of the micro-batch mode for amplified data so as to conquer large data volume, and uses the low-latency property of the data stream mode for compressed data in order to reduce latency. With the complete stream processing logic divided into several feature blocks, it is possible to use the most appropriate execution logic to process the logic in every feature block, thereby achieving balance between high throughput and low latency.

Beneficial Effects of the Invention (1) The present invention makes relevance-based use of the data stream mode and the micro-batch mode for stream data processing in computer systems to effectively increase throughput of distributed stream data processing and reduce latency of distributed stream data processing while maintaining mode shift transparent to its users, thereby improving stream data distributed processing in terms of computer system performance;

(2) The present invention uses a data buffer to enable recovery of failed nodes, so as to fast restore failed nodes to their pre-failure state without interrupting stream data processing in computer systems, thus being transparent to its users and very useful for applications of large-scale clusters where node failures happen frequently; and (3) The present invention requires only modification to the distributed processing system for stream data rather than the stream data processing execution logic at users' side, so as to reduce the overall cost and make deployment of a large-scale distributed stream data processing system more convenient.

LIST OF SYMBOLS IN THE DRAWINGS

| 10: dispatching unit | 20: data receiving unit |
|---|---|
| 30: executing unit | 40: feedback unit |
| 31: data stream mode executing unit | 32: micro-batch mode executing unit |
| 11: central dispatcher | 12: data stream mode dispatcher |
| 13: micro-batch mode dispatcher | 14: data set controlling unit |
| 111: logic analysis module | 112: logic disassemble module |
| 113: dynamic decision module | 114: node failure processing module |
| 115: node load balance module | 121: first operation module |
| 122: first task set dispatcher | 123: first data set dispatcher |
| 131: second operation module | 132: second task set dispatcher |
| 133: second data set dispatcher | 134: intermediate data block control module |
| 41: first operating status feedback module | 42: second operating status feedback module |
| 43: third operating status feedback module | 44: executing status feedback module |

DETAILED DESCRIPTIONS OF THE INVENTION

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein may be interchanged.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

For the purpose of the present invention, API refers to application processing interface. Application processing interface is a collection of predefined functions, for providing application developers with the ability to access a set of processes based on some software or hardware, without accessing source codes or understanding details of internal working mechanisms.

For the purpose of the present invention, a data feature block refers to a single datum having some features or a data set or a data cluster composed of more than or equal to two data. Therefore, a data feature block may be referred to as a feature block, a feature unit, a feature combination, a feature cluster, a feature part, a process feature block or any other terms having similar meaning.

Embodiment 1

The present embodiment provides a distributed dynamic processing method for stream data. The method at least comprises: analyzing and predicting an execution mode of a user stream data processing program and dynamically adjusting the execution mode.

For analyzing and predicting the execution mode of the stream data processing program, the stream data processing program is analyzed and divided into several feature blocks, and the feature blocks are initially mapped to the presently most appropriate execution mode according to their features for execution.

Particularly, in Step S1, the execution mode of at least one data feature block of the data of the user stream data processing program is analyzed and predicted. More specifically, the distributed stream processing program submitted by the user is initially divided based on the information about the executing API used in the distributed stream data processing program and the relation among operations in the context of the program. The complete distributed stream data processing program is divided into several data feature blocks. Afterward, according to features of the data feature blocks, each of the data feature blocks is mapped to the execution mode matching it most for execution. With the previous analysis and prediction of the stream data processing program, performance loss caused by subsequent dynamic adjustment can be minimized.

In Step S2, the execution mode is dynamically adjusted based on an average magnitude of queue latency and a threshold of queue latency of the stream data.

During execution of a distributed processing application, how effectively data clusters are processed depends on many factors, and the volume of data stream from the external data source may vary over time. For these reasons, the execution mode determined according to the foregoing prediction has to be adjusted as time lapses. Preferably, adjustment is made using a "suspension-adjustment-operation" manner.

In Step S3, at least one of the data feature blocks is processed using the execution mode.

Figure 5:
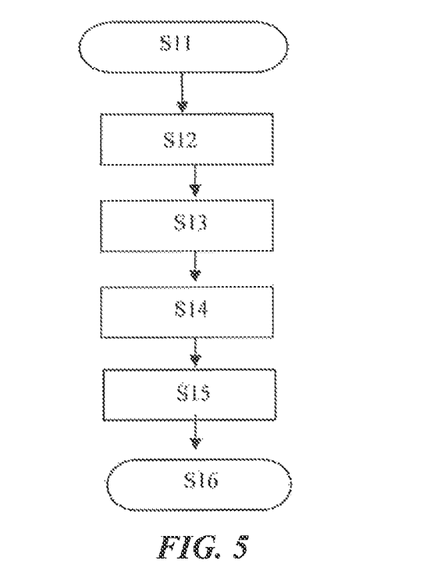
FIG. 5 is a flowchart detailing the step of analyzing and mapping the data stream in the method of present invention method.

Preferably, as shown in FIG. 5, the step of analyzing and predicting the execution mode of the at least one data feature block of the data of the user stream data processing program comprises the following steps:

S11: Start.
S12: At least one operation performed by the user is integrated into a complete operative chain, so as to determine the user topology, or more preferably, all operations performed by the user are integrated into a complete operative chain for determining the user topology.
S13: According to the API functions used by the user and the initial structure of the operative chain, the complete operative chain is divided into at least one data feature block.
S14: The logic features of the data feature blocks are determined and the execution mode is selected according to the logic feature, thereby generating a "Feature Block ID-Execution Mode" list.
S15: The data feature block is mapped to the corresponding execution mode based on the "Feature Block ID-Execution Mode" list so as to execute the part of the program that corresponds to the data feature block.
S16: End.

Figure 6:
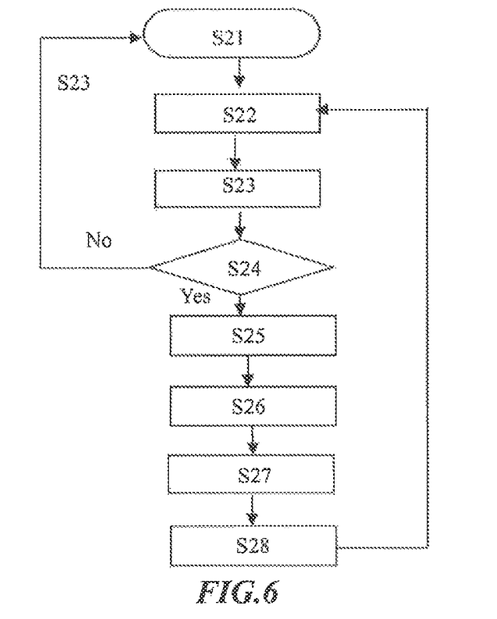
FIG. 6 is a flowchart detailing the dynamic decision module used in the method of present invention method.

Preferably, as shown in FIG. 6, the step of dynamically adjusting the execution mode comprises:
S21: Start.
S22: The current status data of at least one node in a distributed stream data cluster is tallied, wherein the current data status comprises information about the average input data volume m, the average output data volume n, the average queue time t of the stream data and the operation throughput T.
S23: the data amplification of the $x^{th}$ operation is calculated as $$g_x = \frac{n}{m};$$

S24: Based on the current status data, the execution mode is determined and adjusted to:

$$\text{Execution Mode} = \begin{cases} \text{micro-batch mode} & \text{when } t > T_{up} \text{ and } \prod_{x=r}^{q} g_x \leq 1 \\ \text{data stream mode} & \text{when } t < T_{down} \end{cases},$$

wherein, $T_{up}$ is the upper threshold of the queue latency, $T_{down}$ is the lower threshold of the queue latency.

The upper threshold $T_{up}$ and the lower threshold $T_{down}$ are determined using the equations:

$$\begin{cases} T_{up} = T * \alpha \\ T_{down} = T / \alpha \end{cases},$$

wherein, T is a standard time set by the user service level agreement, α is a maximum system tolerance set by the user.

If there is no need to adjust the execution mode, circular determination is performed on the execution mode of the input data of the data feature block. If there is a need to adjust the execution mode, dynamic adjustment is made to the execution mode in a "suspension-adjustment-operation" manner. Particularly, the data processing task for the data feature block is suspended first, and the execution mode is adjusted before the operation is resumed.

Preferably, the execution mode is adjusted while the stream data from the data source is cached in a data buffer, and the stream data in the data buffer is processed based on the adjusted execution mode.

S25: Based on an execution mode shifting instruction, data input of the data feature block is suspended, and the data received in the data feature block are completely processed.

S26: The data to be sent to the data feature block are directed to the data buffer for caching, and adjustment is made to the execution mode of the data feature block when the data are cached.

S27: The data feature block in the adjustment resuming status acquires data from the buffer for processing.

S28: Data input of the data feature block is resumed after completing processing the data from the buffer. That is, after execution for the data in the buffer is done, data are acquired from upstream for subsequent normal execution.

Figure 3:
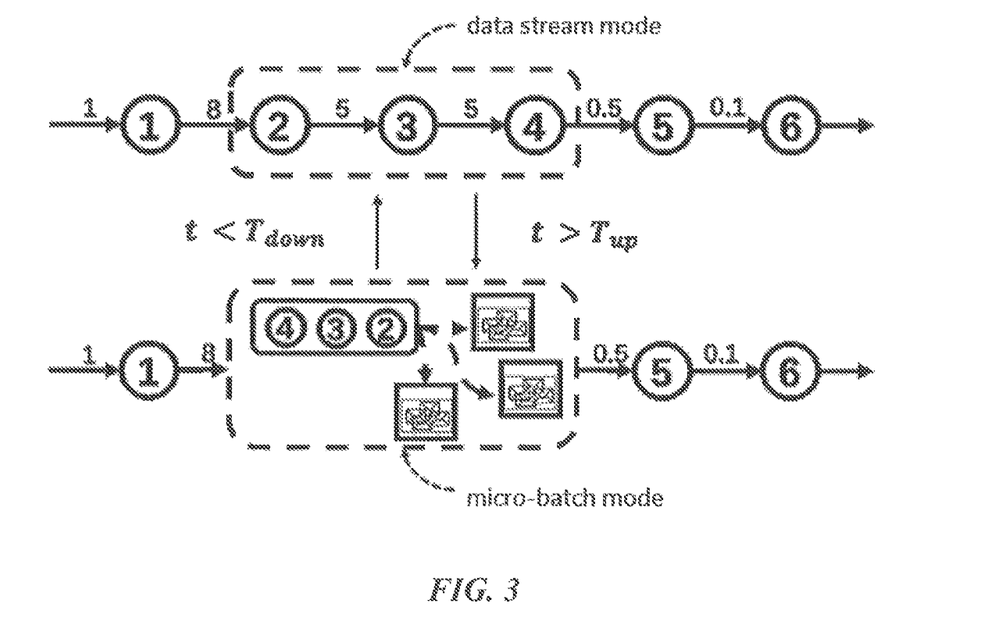
FIG. 3 is a schematic diagram illustrating adjustment of the data stream processing mode according to one embodiment of the present invention.

FIG. 3 shows a preferred embodiment of the present invention. A complete stream processing program comprises six operations, {1, 2, 3, 4, 5, 6}. These different operations are not completely the same in terms of data amplification because they use different APIs. For example, Operation 1 amplifies one datum to eight; Operation 2 reduces 8 data to 5; Operation 3 makes no change in data volume; Operation 4 reduces 5 data to 0.5; Operation 5 reduces 0.5 data to 0.1, and so on. Thus, the basis on which the stream processing program is divided and the notable feature of the data feature block are the amplification of the data. Operations 2, 3 and 4 in the dotted-line frame are those involving high data volume, while operations outside the frame are associated to low data volume. The magnitude of data volume is decided by comparing the data volume with the data volume initially input. In this case, a complete stream processing program is divided into three feature blocks, namely {1}, {2, 3, 4} and {5, 6}. The notable features of the feature blocks are: the feature blocks {1} and {5, 6} require low-volume data processing and the feature block {2, 3, 4} require high-volume data processing.

During stream computing, there are two execution modes. The micro-batch mode W is suitable for high throughput but it brings about high latency. On the other hand, the data stream mode L advantageously has low latency, but its throughput is relatively low. The feature block {2, 3, 4} needs to be processed with high throughput. If the operations in the dotted-line frame are processed using the data stream mode L that has low data throughput, there would be a huge amount of data accumulating between Operations 1 and 2, making the average queue time longer. When the queue latency time increases to the upper threshold $T_{up}$, the execution mode for the operations in the dotted-line frame has to be shifted to the micro-batch mode W. The size of the dotted-line frame is determined using $\Pi_{x=r}{}^q g_x \leq 1$.

The data shown in FIG. 3 are discussed herein for example. $g_1=8/1=8$, $g_2=5/8=0.625$, $g_3=5/5=1$, $g_4=0.5/5=0.1$. $g1*g2*g3*g4=0.5 \leq 1$, which satisfies the condition for shift of the execution mode. Thus, Operations 2, 3, 4 are shifted from the data stream mode L to the micro-batch mode W. The reason why Operation 1 is not included in the shift is that the huge data generated later in Operation 1 may be subsequently addressed using data balance operation, so as to prevent data skew. When the data volume decreases, low latency is even more important. When the average queue time $t<T_{down}$, Operations 2, 3, 4 are shifted back to the data stream mode L from the micro-batch mode W.

Figure 4:
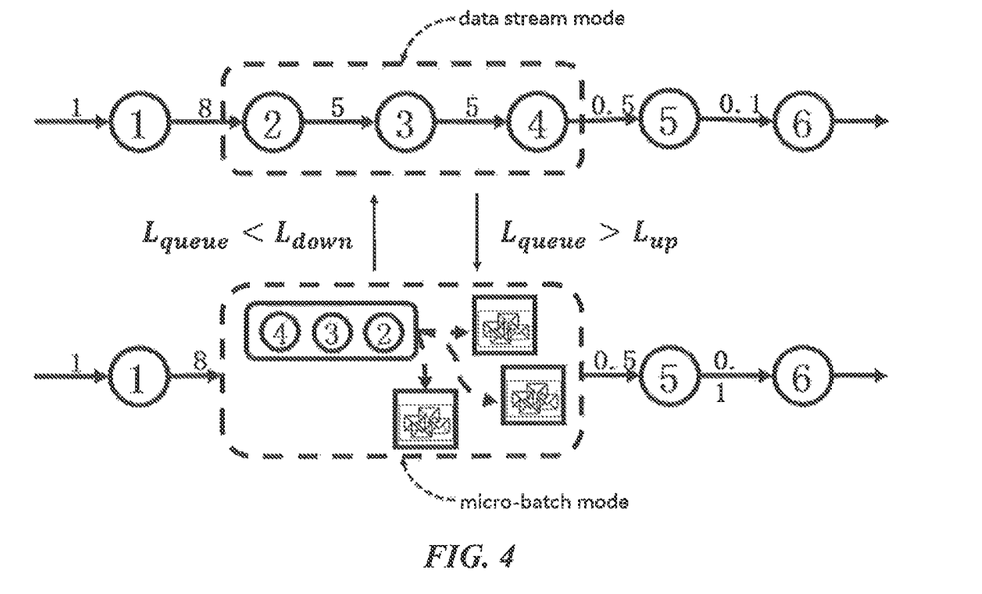
FIG. 4 is a schematic diagram illustrating adjustment of the data stream processing mode according to another embodiment of the present invention.

As shown in FIG. 4, it is assumed that there are n operations. The thresholds of the waiting queue in the $p^{th}$ operation are $L_{up}$ and $L_{down}$, and $\lambda_m$ is the amplification of the $m^{th}$ operation. Here, the range of the dotted-line frame starts at the $p^{th}$ operation and ends at the $q^{th}$ operation. Operation q is determined as:

$$\left\{ Q = \left\{ q_k \,\middle|\, \prod_{m=min\{1,p-1\}}^{q_k} \lambda_m \leq 1, 1 \leq k \leq n \right\} \right. \\ q = \min\{Q\}$$

The data shown in FIG. 4 are discussed herein for example. $\lambda_1=8/1=8$, $\lambda_2=5/8=0.625$, $\lambda_3=5/5=1$, $\lambda_4=0.5/5=0.1$, $\Pi_{n=2-1}{}^4 \lambda_n = 0.5 \leq 1$. Operation q is the minimal of Q, i.e. q=0.5.

Embodiment 2

The present embodiment is based on further improvement to Embodiment 1, and no repeated description is provided herein.

The present embodiment provides a distributed dynamic processing method for stream data, the method not only comprises:
S1: analyzing and predicting an execution mode of at least one data feature block of the data of a user stream data processing program;
S2: dynamically adjusting the execution mode based on an average magnitude of queue latency and a threshold of queue latency of the stream data; and
S3: processing corresponding said at least one data feature block based on the execution mode, but also comprises:
S4: recovering failed nodes by means of creating cached data; and/or
S5: dynamically adjusting the number of nodes based on a balloon model so as to achieve load balance.

The time interval between batches during stream data processing is set by the user. In each time interval, the data output by every operation are cached to support data consistency. In the event that a subsequent operation loses data due to node breakdown, the data cached in the output buffer of previous operations can be used for calculation, so as to recover the lost data and in turn restore the failed node.

Figure 7:
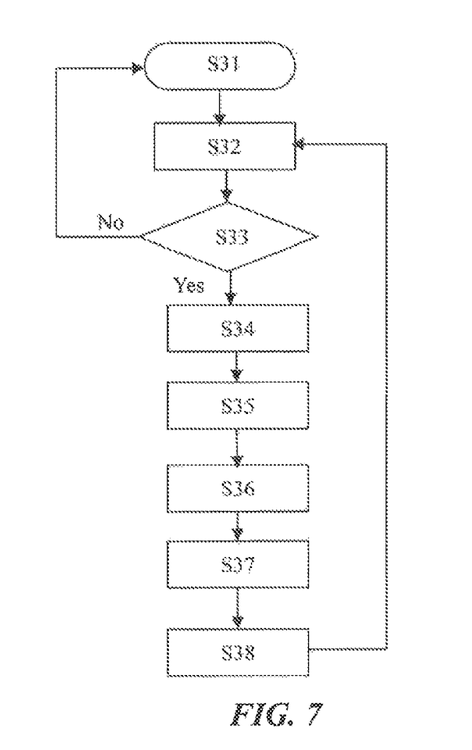
FIG. 7 is a flowchart detailing the node failure processing module used in the method of present invention method.

As shown in FIG. 7, during restoration of the failed node, in the event that a subsequent operation has data lost due to node breakdown, the data cached in the output buffer of previous operations are extracted for calculation, thereby recovering lost data.

Preferably, restoration of a failed node comprises:
S31: start;
S32: determining that the node has failed and entering restoration mode when there has not been heartbeat packet of the node received in expired time;
S33: suspending the data-transmitting operation to the failed node right before the last operation carried out by the node, and caching the output data in a buffer;
S34: acquiring the checkpoint information of the failed node, and restoring the failed node to the last checkpoint status;
S35: acquiring the data executed by the failed node after the last checkpoint from the buffer of the previous operations for repeated execution, so as to restore to the status when the failure happens;
S36: after restoration, entering normal executing status for subsequent operations.

Since the demand for resources during distributed stream data processing varied over time, it is necessary to dynamically allocate resources using a balloon model according to the current status of the cluster under processing, so as to achieve load balance across the whole system. When the demand for resources increases, the balloon of the corresponding part of resources is inflated, thereby triggering the system to provide more processing nodes and shunt data. When the demand for resources decreases, the balloon of the corresponding part of resources is deflated to trigger the system to recall the resources.

Figure 8:
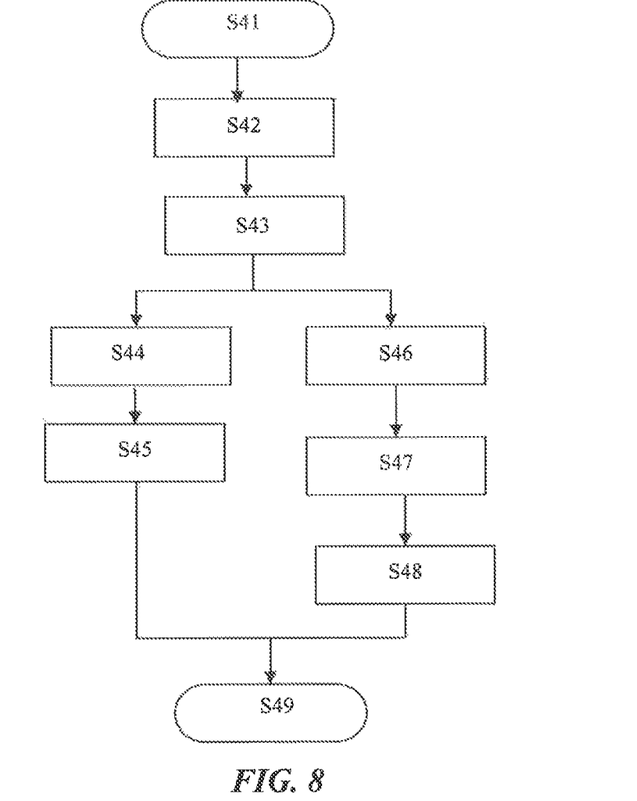
FIG. 8 is a flowchart detailing the node load balancing module used in the method of present invention method.

As shown in FIG. 8, the step of dynamically adjusting the number of nodes based on the balloon model so as to achieve load balance comprises:
S41: start;
S42: configuring each data feature block with a balloon model for data demand adjustment, so as to determine data demand;
S43: setting the balloon model to inflation status and/or deflation status based on the current status of the data feature blocks, that is, inflation and deflation is performed according to the variation in resource demand of the feature blocks, when the balloon model requires inflation, Step S44 is performed, when the balloon model requires deflation, Step S46 is performed, otherwise, the method is ended at this point;

S44: the balloon model performs inflation;

S45: the balloon model in the inflation status increases assigned data volume of the data feature block;

S46: the balloon model performs deflation;

S47: the balloon model in the deflation status retrieves excessive data resources of the data feature block, and puts the retrieved data resource into a resource pool for reallocation, meaning that the method goes back to Step S45;

S48: end.

Figure 9:
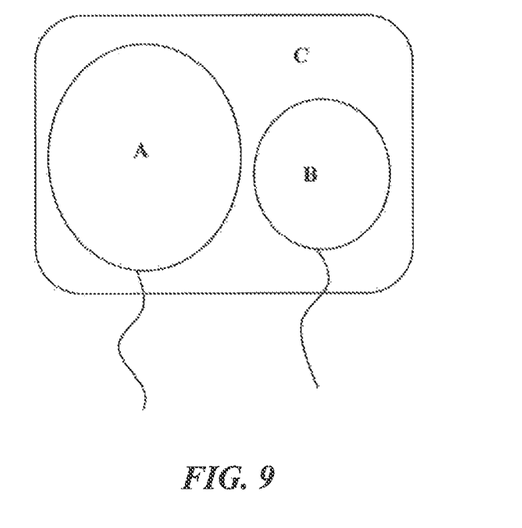
FIG. 9 is a logic module diagram showing the balloon model of the present invention.

As shown in FIG. 9, the magnitude of the balloon model reflects the magnitude of the resources initially set by the user. Balloon A represents the data resources occupied by data feature block A. Balloon B represents the data resources occupied by data feature block B. Frame C defines the resources remaining available in the system. Where there is a need for more resources, the balloons inflate to expand their use of resources. It is to be noted that the resources of the balloon model is limited. If the remaining resources cannot cater for the expansion, the balloon model can only expand to the magnitude of the remaining resources and it is impossible for the balloon model to expand infinitely. To reduce resources used, the balloon model deflates.

Preferably, increasing and recalling resources used in feature blocks happen in two occasions: (1) normal resource demand and resource release during execution of data feature blocks; and (2) adjustment of the execution mode during execution of data feature blocks due to variations in data volume and in execution context in the form of applying for additional resources or releasing excessive resources.

For increasing resources for data feature blocks, the following steps are to be performed:

S51: counting the new resources included when the data resource balloon inflates into the resources used by the data feature blocks;

S52: locking the new resources, and providing an exclusive lock for the newly added resources to the data feature block; and S53: the data feature block using the new resources to process data.

For decreasing resources for data feature blocks, the following steps are to be performed:

S61: counting the resources released when the data resource balloon deflates into the resources to be recalled;

S62: waiting until the task on the resources to be recalled is finished and the resources become available;

S63: unlocking the exclusive lock for the resources to be recalled set by the data feature block; and S64: including the resources to be recalled in the resource pool of the system for later allocation.

The present invention, with the attempt to eliminate trade-off between high throughput and low latency of distributed processing for stream data, provides the distributed dynamic processing method for stream data. It, according to prediction made before execution of stream data processing logic and variations of the external data source and of cluster execution capacity during stream data processing, selects the most appropriate execution mode to execute the corresponding part of the stream data processing logic, so as to effectively increase throughput and decrease latency of distributed stream data processing while maintaining mode shift transparent to its user and preventing repeated stream data processing, thereby improving performance of distributed processing for stream data.

Embodiment 3

The present embodiment provides further improvement based on Embodiment 1, Embodiment 2 and their combination, and no repeated description is provided herein.

Figure 1:
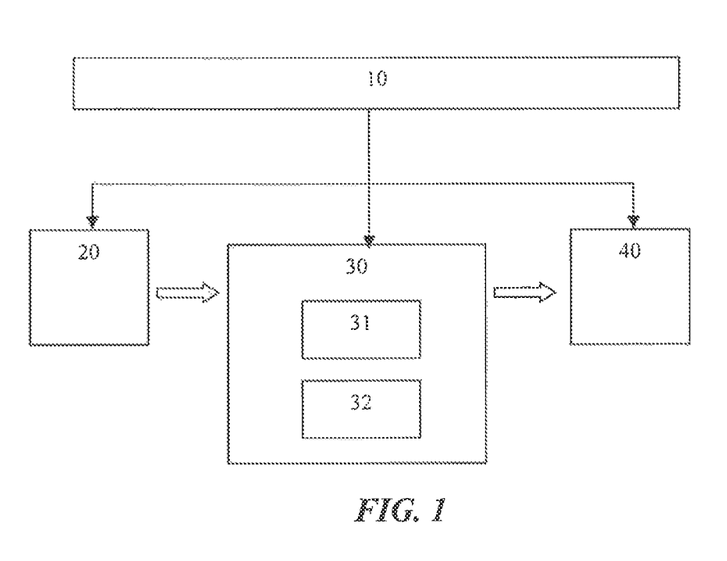
FIG. 1 is a logic module diagram showing the overall structure of the present invention.

The present invention further provides a distributed dynamic processing system for stream data, as shown in FIG. 1. The distributed dynamic processing system for stream data at least comprises a dispatching unit 10, a data receiving unit 20, an executing unit 30, and a feedback unit 40.

In distributed processing for stream data, a user submits his/her stream data processing logic to the dispatching unit 10 of the distributed processing system. The dispatching unit 10 comprises one or more of an application-specific integrated circuit, a processor, a server and a cloud server for dispatching stream processing tasks. The dispatching unit 10 deploys stream processing tasks over calculation nodes.

According to the stream processing task logic of the user, the data receiving unit 20 receives data from an external data source for later execution. The data receiving unit 20 comprises one or more of a port for transmitting and storing data, an application-specific integrated circuit, a CPU, a microprocessor, and a memory.

The executing unit 30 processes the received data according to the execution logic of the user. The executing unit 30 comprises a data stream mode executing unit 31 and a micro-batch mode executing unit 32. The executing unit 30 comprises one or more of an application-specific integrated circuit, a CPU, a microprocessor, and a memory for executing data calculation and processing.

The feedback unit 40 writes the processed data into permanent memory or returns them to the user. The feedback unit 40 comprises one or more of an application-specific integrated circuit, a CPU, a microprocessor, a memory, and a server for storing calculated and processed data.

Particularly, how the dispatching unit 10 and the executing unit 30 execute determines the overall performance of the distributed processing system.

Figure 2:
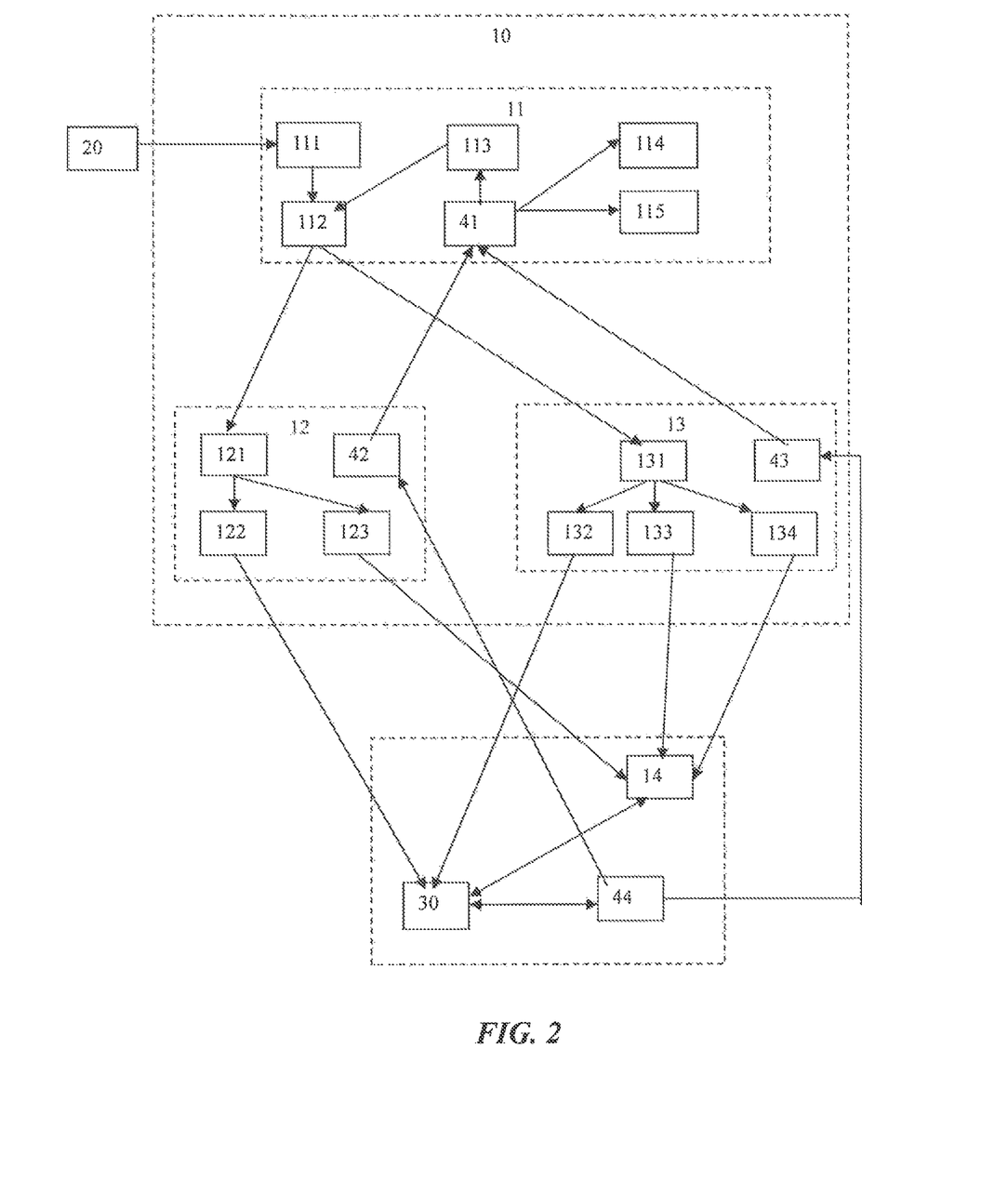
FIG. 2 is a logic module diagram showing task dispatch according to the present invention.

As shown in FIG. 2, the dispatching unit 10 comprises a central dispatcher 11, a data stream mode dispatcher 12, and a micro-batch mode dispatcher 13. The central dispatcher 11 comprises a logic analysis module 111, a logic disassemble module 112, a dynamic decision module 113, a node failure processing module 114, and a node load balance module 115.

The logic analysis module 111 comprises one or more of an application-specific integrated circuit, a CPU, a microprocessor, a memory, and a server for logic analysis. The logic disassemble module 112 comprises one or more of an application-specific integrated circuit, a CPU, a microprocessor, a memory, and a server for logic analysis, disassemble, prediction and logic data calculation. The dynamic decision module 113 comprises one or more of an application-specific integrated circuit, a CPU, a microprocessor, a memory, and a server for logic analysis and data processing. The node failure processing module 114 comprises one or more of an application-specific integrated circuit, a CPU, a microprocessor, a controller, a memory, and a server for analyzing, processing and controlling node data volume. The node load balance module 115 comprises one or more of an application-specific integrated circuit, a CPU, a microprocessor, a controller, a memory, and a server for allocating resources and adjusting the number of nodes for data feature blocks.

Therein, the logic analysis module 111 is connected to the data receiving unit 20 for performing logic analysis on the distributed processing program for stream data received from the user. The logic disassemble module 112 predicts and adjusts the execution mode of the data feature blocks as a result of disassembly according to a dynamic adjustment manner, and sends the data feature blocks to the corresponding data stream mode dispatcher 12 or the micro-batch mode dispatcher 13. The dynamic decision module 113 makes decisions according to the operating status of the whole distributed dynamic processing system for stream data, and instructs the logic disassemble module 112 to dynamically disassemble the distributed processing program and re-predict the execution mode. The node failure processing module 114 restores failed nodes. The node load balance module 115 regulates the number of nodes of the data feature block for load balance among the nodes. The data stream mode dispatcher 12 comprises a first operation module 121, a first task set dispatcher 122, and a first data set dispatcher 123.

The first operation module 121 generates operations of the data stream mode. The first task set dispatcher 122 dispatches the task sets of the data stream mode. The first data set dispatcher 123 dispatches the data sets of the data stream mode. The micro-batch mode dispatcher 13 comprises a second operation module 131, a second task set dispatcher 132, a second data set dispatcher 133, and an intermediate data block control module 134.

Preferably, the first operation module 121 and the second operation module 131 comprise one or more of an application-specific integrated circuit, a CPU, a microprocessor, a memory, and a server for generating operations of the data stream mode or of the micro-batch mode.

The first task set dispatcher 122 and the second task set dispatcher 132 comprises one or more of an application-specific integrated circuit, a CPU, a microprocessor, a memory, and a server for dispatching the task sets of the data stream mode or of the micro-batch mode.

The first data set dispatcher 123 and the second data set dispatcher 133 comprise one or more of an application-specific integrated circuit, a CPU, a microprocessor, a memory, and a server for central dispatch of data sets.

The intermediate data block control module 134 comprises one or more of an application-specific integrated circuit, a CPU, a microprocessor, a controller, a memory, and a server for controlling the intermediate data blocks of the micro-batch mode.

The second operation module 131 generates operations of the micro-batch mode. The second task set dispatcher 132 dispatches the task sets of the micro-batch mode. The second data set dispatcher 133 dispatches the data sets of the micro-batch mode. The intermediate data block control module 134 controls the intermediate data blocks of the micro-batch mode. The disclosed distributed dynamic processing system for stream data comprises a data set controlling unit 14 and an executing unit 30 for execution.

The data set controlling unit 14 dispatches data for central control according to data sets sent by the first data set dispatcher 123 of the data stream mode dispatcher 12, the second data set dispatcher 133 and the intermediate data block control module 134 of the micro-batch mode dispatcher 13.

The executing unit 30 executes the program using the corresponding execution mode according to the data feature blocks sent by the first task set dispatcher 122 and by the second task set dispatcher 132. Therein, the data stream mode executing unit 31 executes the data feature block sent by the first task set dispatcher 122. The micro-batch mode executing unit 32 executes the data feature blocks sent by the second task set dispatcher 132.

In the disclosed distributed dynamic processing system for stream data, the dispatching unit 10 analyzes and predicts the execution mode of at least one data feature block of data in a stream data processing program received by the data receiving unit, and dynamically adjusts the execution mode based on the average magnitude of the queue latency of the stream data and the threshold of the queue latency. The executing unit 30 processes the corresponding at least one data feature block based on the execution mode. The node failure processing module 114 recovers data of a failed node by means of creating cached data. The node load balance module 115 dynamically adjusts the number of nodes based on a balloon model so as to achieve load balance.

The central dispatcher 11 dynamically adjusts the execution mode by:

having the logic analysis module 111 tally the current status data of at least one node in a distributed stream data cluster, having the dynamic decision module 113 adjust the execution mode based on the current status data to:

$$\text{Execution Mode} = \begin{cases} \text{micro-batch mode} & \text{when } t > T_{up} \text{ and } \prod_{x=r}^{q} g_x \leq 1 \\ \text{data stream mode} & \text{when } t < T_{down} \end{cases},$$

wherein, $T_{up}$ is the upper threshold of the queue latency, $T_{down}$ is the lower threshold of the queue latency, $g_x$ is the data amplification of the $x^{th}$ operation, $$g_x = \frac{n}{m},$$

m is the average input data volume, and n is the average output data volume, and having the logic disassemble module 112 disassemble the data feature block based on the execution mode shifting instruction from the dynamic decision module 113 or the analysis result of the logic analysis module 11, and send the disassembled data feature block to the corresponding data stream mode dispatcher 12 and the micro-batch mode dispatcher 13, respectively, so that the data stream mode dispatcher 12 and the micro-batch mode dispatcher 13 process the data assigned thereto correspondingly.

Preferably, the logic disassemble module 112 dynamically adjusts the execution mode further by: dynamically adjusting the execution mode in a "suspension-adjustment-operation" manner.

The "suspension-adjustment-operation" manner comprises: when the data set controlling unit 14 caches the stream data of the data source in the data buffer, the dynamic decision module 113 orders the logic disassemble module 112 to adjust the execution mode. The executing unit 30 processes the stream data in the data buffer based on the adjusted execution mode.

Preferably, the logic analysis module 111 integrates at least one operation of the user into a complete operative chain, so as to determine the topology of the user.

The logic disassemble module 112, according to the API function used by the user and the initial structure of the operative chain, divides the complete operative chain into at least one data feature block. Then it determines the logic feature of the data feature block, and selects the execution mode according to the logic feature, thereby generating the "Feature Block ID-Execution Mode" list. It further maps the data feature block to the corresponding execution mode based on the "Feature Block ID-Execution Mode" list so as to execute the part of the program that corresponds to the data feature block.

Preferably, the step of dynamic adjustment of the execution mode further comprises: having the first operation module 121 of the data stream mode dispatcher 12 or the second operation module 131 of the micro-batch mode dispatcher 13 suspend data input of the data feature block based on the execution mode shifting instruction from the central dispatcher 11, and having the executing unit 30 complete processing the data received in the data feature block; making the first operation module 121 or the second operation module 131 direct data to be sent to the data feature block to the data buffer in the data set controlling unit 14 through the first data set dispatcher 123, the second data set dispatcher 133 and the intermediate data block control module 134, respectively, for caching and adjusting the execution mode of the data feature block; when the data feature block is in an adjustment resuming status, making the data set controlling unit 14 acquire the corresponding data from the buffer for processing; and making first operation module 121 or second operation module 13 resume data input of the data feature block after completing processing the data from the buffer.

Preferably, the step where the node load balance module 115 dynamically adjusts the number of nodes based on a balloon model so as to achieve load balance comprises: Configuring the data feature block with a balloon mode required for data demand adjustment; setting the balloon mode to inflation status and/or deflation status based on the current status of the data feature block; wherein the balloon mode, when in the inflation status, increases the assigned data volume of the data feature block, and/or when in the deflation status, retrieves excessive data from the data feature block, and allocates the retrieved data of the data feature block to a resource pool for reallocation.

Preferably, the feedback unit 40 comprises a first operating status feedback module 41, a second operating status feedback module 42, a third operating status feedback module 43, and an executing status feedback module 44 for monitoring and providing feedback about the operating status of every execution mode. Preferably, the first operating status feedback module 41, the second operating status feedback module 42, the third operating status feedback module 43 and the executing status feedback module 44 each have one or more of an application-specific integrated circuit, a CPU, a microprocessor, a controller, a memory and a server for acquiring, processing and feeding back data.

Therein, the executing status feedback module 44 is connected to the executing unit 30 for monitoring the current executing status of every data feature block of the executing unit 30 in each execution mode.

The second operating status feedback module 42 tracks and provides feedback about the executing status of the data feature block in the data stream mode. The third operating status feedback module 43 tracks and provides feedback about the executing status of the data feature block in the micro-batch mode. The executing status feedback module 44 sends the current executing status data to the corresponding second operating status feedback module 42 and third operating status feedback module 43, respectively.

The first operating status feedback module 41 is set in the central dispatcher 11 to track and provide feedback about the operating status of the whole distributed dynamic processing system for stream data. The first operating status feedback module 41 receives the current executing status data sent by the second operating status feedback module 42 and by the third operating status feedback module 43, and sends the collected data to the dynamic decision module 113, the node failure processing module 114, and the node load balance module 115, so that the dynamic decision module 113 can make shift decision of the execution mode based on the executing status data, the node failure processing module 114 can restore the failed nodes, and the node load balance module 115 can replenish or recall the resources properly.

The disclosed distributed dynamic processing system for stream data is therefore a system featuring dynamic circular feedback, which uses dynamic adjustment to ensure the optimal efficiency of distributed processing for stream data, and features its low latency yet high throughput.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A distributed dynamic processing method for stream data within a computer system, comprising the steps of:
 analyzing and predicting an execution mode of at least one data feature block of data of a user stream data processing program within a computer system;
 determining an average magnitude of queue latency of the stream data;
 determining a threshold of queue latency of the stream data;
 dynamically adjusting the execution mode based on the average magnitude of queue latency and the threshold of queue latency of the stream data;
 processing within the computer system the at least one data feature block based on the dynamically adjusted execution mode;
 recovering data of a failed node by means of creating cached data; and
 dynamically adjusting the number of nodes based on a balloon model so as to achieve load balance.

2. The distributed dynamic processing method for stream data within a computer system of claim 1, where the step of dynamically adjusting the execution mode further comprises:
 adjusting the execution mode while the stream data from a data source is cached in a data buffer within the computer system; and
 processing the stream data in the data buffer based on the adjusted execution mode.

3. The distributed dynamic processing method for stream data within a computer system of claim 1, where the step of dynamically adjusting the execution mode further comprises comprising:
 suspending data input of the data feature block based on an execution mode shifting instruction, and completing processing the data received in the data feature block within the computer system;
 directing the data to be sent to the data feature block to the data buffer within the computer system for caching and adjusting the execution mode of the data feature block;
 the data feature block, in an adjustment resuming status, acquiring data from the data buffer for processing; and
 resuming data input of the data feature block after completing processing the data from the buffer within the computer system.

4. The distributed dynamic processing method for stream data within a computer system of claim 1, where the step of dynamically adjusting the number of nodes further comprises:
 configuring the data feature block with a balloon model required for data demand adjustment; and
 setting the balloon model so that the balloon model adjusts to inflation status and/or deflation status based on the current status of the data feature block;
 wherein the balloon model in the inflation status increases assigned data volume of the data feature block; and/or
 the balloon model in the deflation status retrieves excessive data from the data feature block, and allocates the retrieved data of the data feature block to a resource pool for reallocation.

5. A distributed dynamic processing method for stream data within a computer system, comprising the steps of:
 analyzing and predicting an execution mode of at least one data feature block of data of a user stream data processing program within a computer system;
 determining an average magnitude of queue latency of the stream data;
 determining a threshold of queue latency of the stream data;
 dynamically adjusting the execution mode based on the average magnitude of queue latency and the threshold of queue latency of the stream data; and
 processing within the computer system the at least one data feature block based on the dynamically adjusted execution mode,
 where the step of analyzing and predicting the execution mode comprises:
 integrating at least one operation of a user into a complete operative chain, so as to
 determine a topology of the user;
 dividing the complete operative chain into at least one data feature block according to an application programming interface function used by the user and an initial structure of the operative chain;
 determining a logic feature of the data feature block and selecting the execution mode according to the logic feature so as to generate a "Feature Block ID-Execution Mode" list; and
 mapping the data feature block to the corresponding execution mode based on the "Feature Block ID-Execution Mode" list so as to execute the part of the program within the computer system that corresponds to the data feature block.

* * * * *